(12) United States Patent
Maiman et al.

(10) Patent No.: US 11,831,688 B2
(45) Date of Patent: Nov. 28, 2023

(54) SYSTEMS AND METHODS FOR NETWORK SECURITY

(71) Applicant: Capital One Services, LLC, McLean, VA (US)

(72) Inventors: Tyler Maiman, Melville, NY (US); Abdelkader Benkreira, Washington, DC (US); Brendan Way, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 22 days.

(21) Appl. No.: 17/352,054

(22) Filed: Jun. 18, 2021

(65) Prior Publication Data
US 2022/0407893 A1  Dec. 22, 2022

(51) Int. Cl.
*H04L 9/40* (2022.01)
*H04W 12/06* (2021.01)
(Continued)

(52) U.S. Cl.
CPC ............ *H04L 63/205* (2013.01); *H04L 63/08* (2013.01); *H04L 63/0876* (2013.01);
(Continued)

(58) Field of Classification Search
None
See application file for complete search history.

(56) References Cited

U.S. PATENT DOCUMENTS

| | | | |
|---|---|---|---|
| 6,088,451 A * | 7/2000 | He | H04L 63/0807 709/227 |
| 8,170,953 B1 * | 5/2012 | Tullis | G06Q 20/085 705/77 |

(Continued)

FOREIGN PATENT DOCUMENTS

WO    2007/068992    6/2007

OTHER PUBLICATIONS

Misbahuddin et al ("Design of a Risk Based Authentication System using Machine Learning Techniques," 2017, IEEE, pp. 1-6). (Year: 2017).*

(Continued)

*Primary Examiner* — Luu T Pham
*Assistant Examiner* — James J Wilcox
(74) *Attorney, Agent, or Firm* — HUNTON ANDREWS KURTH LLP

(57) ABSTRACT

A security system for a network may be configured to detect one or more failed authentication attempts to access the network by at least one user device and determine the number of the failed authentication attempts. The system may determine a first risk score based on the number of failed authentication attempts and determine whether the first risk score is greater than or equal to a first risk score threshold and generate a first notification indicating that the user device is attempting to gain unauthorized access onto the network. The system may transmit the first notification to an administrator of the network, determine the user device is successfully authenticated to access the network after the (Continued)

number of failed authentication attempts has been detected, and apply a first set of network activity restrictions to the user device.

20 Claims, 6 Drawing Sheets

(51) Int. Cl.
  *H04W 12/71* (2021.01)
  *H04W 12/08* (2021.01)
(52) U.S. Cl.
  CPC ............ *H04L 63/10* (2013.01); *H04W 12/06* (2013.01); *H04W 12/71* (2021.01); *H04W 12/08* (2013.01)

(56) References Cited

U.S. PATENT DOCUMENTS

| | | | |
|---|---|---|---|
| 8,407,682 B2 | 3/2013 | Reisman | |
| 8,875,255 B1* | 10/2014 | Dotan | H04L 63/08 713/182 |
| 9,342,691 B2 | 5/2016 | Maestas | |
| 9,444,824 B1* | 9/2016 | Balazs | H04L 63/105 |
| 9,537,857 B1* | 1/2017 | Koved | H04L 9/06 |
| 9,633,322 B1* | 4/2017 | Burger | G06Q 20/405 |
| 9,887,995 B2 | 2/2018 | Rotter et al. | |
| 9,980,213 B2 | 5/2018 | Lynch et al. | |
| 10,015,153 B1* | 7/2018 | Dotan | G06F 21/316 |
| 10,015,185 B1* | 7/2018 | Kolman | H04L 63/1425 |
| 10,069,886 B1* | 9/2018 | Lundsgaard | H04L 65/60 |
| 10,367,835 B1* | 7/2019 | Raviv | H04L 63/1425 |
| 10,396,985 B1* | 8/2019 | Nagelberg | H04L 9/3247 |
| 10,404,684 B1* | 9/2019 | Chittireddy | H04W 60/04 |
| 10,425,432 B1* | 9/2019 | Raviv | H04L 63/1425 |
| 10,506,426 B1* | 12/2019 | Rule | H04L 63/0853 |
| 10,511,621 B1 | 12/2019 | Thomson et al. | |
| 10,572,947 B1* | 2/2020 | Berends | G06Q 50/163 |
| 10,721,195 B2* | 7/2020 | Jakobsson | H04L 51/48 |
| 10,755,281 B1* | 8/2020 | Yip | G06Q 20/4016 |
| 10,805,265 B2 | 10/2020 | Murthy | |
| 10,978,176 B2* | 4/2021 | Cha | G16H 50/20 |
| 11,061,667 B1* | 7/2021 | Gujarathi | H04L 67/10 |
| 11,101,986 B2* | 8/2021 | Carmignani | H04L 63/0861 |
| 11,126,745 B1* | 9/2021 | Sankuratripati | G06F 3/0482 |
| 11,164,269 B1* | 11/2021 | Locke | H04W 4/024 |
| 11,232,870 B1* | 1/2022 | Shaashua | G16H 50/30 |
| 11,379,913 B1* | 7/2022 | Perelli-Minetti | G06Q 40/125 |
| 11,410,153 B1* | 8/2022 | Zhang | G06Q 20/327 |
| 11,546,338 B1* | 1/2023 | Charnauski | G06F 21/32 |
| 11,586,426 B2* | 2/2023 | Kibel | G06F 8/60 |
| 11,597,156 B2* | 3/2023 | Luan | G06T 7/0004 |
| 11,699,155 B2* | 7/2023 | Dutt | H04W 12/126 705/325 |
| 2004/0030932 A1* | 2/2004 | Juels | H04L 9/0844 713/168 |
| 2005/0120082 A1* | 6/2005 | Hesselink | H04L 63/0272 709/219 |
| 2005/0138426 A1* | 6/2005 | Styslinger | H04L 63/0281 709/224 |
| 2007/0220614 A1* | 9/2007 | Ellis | G06F 21/645 726/27 |
| 2007/0253553 A1* | 11/2007 | Abdul Rahman | G07F 7/1008 380/259 |
| 2008/0120699 A1* | 5/2008 | Spear | H04L 63/10 709/225 |
| 2009/0064334 A1* | 3/2009 | Holcomb | H04L 63/1408 726/24 |
| 2009/0089079 A1* | 4/2009 | Goldhaber | G16H 50/30 705/2 |
| 2010/0100962 A1* | 4/2010 | Boren | H04L 63/1441 726/25 |
| 2010/0153146 A1* | 6/2010 | Angell | G06Q 40/08 705/7.28 |
| 2010/0153147 A1* | 6/2010 | Angell | G06Q 10/04 705/7.28 |
| 2011/0252459 A1* | 10/2011 | Walsh | H04L 63/0823 726/4 |
| 2011/0270756 A1* | 11/2011 | Tullis | G06Q 20/10 705/44 |
| 2011/0296179 A1* | 12/2011 | Templin | H04L 9/08 713/168 |
| 2011/0302638 A1* | 12/2011 | Cha | G06F 21/57 726/6 |
| 2011/0314290 A1* | 12/2011 | Fort | H04L 9/0822 713/176 |
| 2012/0023558 A1* | 1/2012 | Rafiq | H04L 63/08 709/202 |
| 2012/0124664 A1* | 5/2012 | Stein | H04L 63/0245 726/22 |
| 2013/0024238 A1* | 1/2013 | Nielson | G06Q 40/06 705/7.28 |
| 2013/0197381 A1* | 8/2013 | Charlton | G16H 50/30 600/523 |
| 2013/0254875 A1* | 9/2013 | Sama | G06F 21/31 726/19 |
| 2013/0317399 A1* | 11/2013 | Ribble | G16H 20/30 601/84 |
| 2014/0026187 A1* | 1/2014 | Johnson | H04L 63/08 726/3 |
| 2014/0047510 A1* | 2/2014 | Belton | H04W 12/069 726/4 |
| 2014/0164249 A1* | 6/2014 | Guerrino | G06Q 20/3821 705/64 |
| 2014/0189829 A1* | 7/2014 | McLachlan | G06Q 20/4014 726/6 |
| 2014/0196115 A1* | 7/2014 | Pelykh | H04L 63/08 726/4 |
| 2014/0272911 A1* | 9/2014 | York | G09B 7/00 434/362 |
| 2014/0337243 A1* | 11/2014 | Dutt | G06Q 20/327 705/325 |
| 2015/0073987 A1* | 3/2015 | Dutt | G06Q 20/327 705/44 |
| 2015/0105049 A1* | 4/2015 | Golaup | H04W 12/06 455/411 |
| 2015/0128205 A1* | 5/2015 | Mahaffey | H04L 63/105 726/1 |
| 2015/0188949 A1* | 7/2015 | Mahaffey | H04L 41/0894 726/1 |
| 2015/0324559 A1* | 11/2015 | Boss | G06Q 50/01 726/1 |
| 2015/0324606 A1* | 11/2015 | Grondin | G06F 3/0482 726/1 |
| 2015/0326601 A1* | 11/2015 | Grondin | H04L 63/1433 726/25 |
| 2015/0363769 A1* | 12/2015 | Ronca | G06Q 20/381 705/64 |
| 2015/0363770 A1* | 12/2015 | Ronca | G06Q 20/382 705/64 |
| 2015/0363772 A1* | 12/2015 | Ronca | G06Q 20/3829 705/71 |
| 2015/0363773 A1* | 12/2015 | Ronca | G06Q 40/02 705/71 |
| 2015/0363777 A1* | 12/2015 | Ronca | H04L 9/3236 705/75 |
| 2015/0363778 A1* | 12/2015 | Ronca | H04L 9/3236 705/71 |
| 2015/0363782 A1* | 12/2015 | Ronca | G06Q 20/4016 705/75 |
| 2015/0363783 A1* | 12/2015 | Ronca | G06Q 20/382 705/71 |
| 2015/0363876 A1* | 12/2015 | Ronca | G06Q 40/04 705/37 |
| 2015/0365283 A1* | 12/2015 | Ronca | G06Q 20/065 705/71 |
| 2016/0065608 A1* | 3/2016 | Futty | H04L 63/1433 726/25 |
| 2016/0066189 A1* | 3/2016 | Mahaffey | H04W 12/12 455/405 |

(56) References Cited

U.S. PATENT DOCUMENTS

| | | | |
|---|---|---|---|
| 2016/0080355 A1* | 3/2016 | Greenspan | H04L 63/08 726/7 |
| 2016/0162900 A1* | 6/2016 | Dutt | G06Q 20/386 705/44 |
| 2016/0212115 A1* | 7/2016 | Hamlin | H04L 63/105 |
| 2016/0226981 A1 | 8/2016 | McCann et al. | |
| 2016/0291940 A1* | 10/2016 | Searle | H04L 67/303 |
| 2016/0291959 A1* | 10/2016 | Searle | H04L 41/082 |
| 2016/0294605 A1* | 10/2016 | Searle | H04L 41/069 |
| 2016/0294614 A1* | 10/2016 | Searle | H04L 67/34 |
| 2016/0300054 A1* | 10/2016 | Turgeman | G06F 21/36 |
| 2016/0359904 A1* | 12/2016 | Ben Ezra | H04L 63/10 |
| 2017/0004274 A1* | 1/2017 | Mehta | G16H 70/60 |
| 2017/0004275 A1* | 1/2017 | Mehta | G16H 50/70 |
| 2017/0041338 A1* | 2/2017 | Martini | H04L 63/1416 |
| 2017/0048215 A1* | 2/2017 | Straub | H04L 63/0823 |
| 2017/0048269 A1* | 2/2017 | York | H04L 67/10 |
| 2017/0048319 A1* | 2/2017 | Straub | G06F 16/9574 |
| 2017/0053108 A1* | 2/2017 | Jakobsson | G06F 21/32 |
| 2017/0063900 A1* | 3/2017 | Muddu | G06F 16/285 |
| 2017/0083704 A1* | 3/2017 | Nie | G06F 21/552 |
| 2017/0213145 A1* | 7/2017 | Pathak | G08B 21/0446 |
| 2017/0228635 A1* | 8/2017 | Diev | G06N 3/08 |
| 2017/0289134 A1* | 10/2017 | Bradley | H04L 63/105 |
| 2017/0325749 A1* | 11/2017 | Shah | A61B 5/7275 |
| 2017/0345003 A1* | 11/2017 | Spears | H04L 63/102 |
| 2018/0018747 A1* | 1/2018 | Krishnan | G06Q 50/265 |
| 2018/0124068 A1* | 5/2018 | Ruhlen | H04L 67/60 |
| 2018/0124096 A1* | 5/2018 | Schwartz | H04W 8/22 |
| 2018/0212960 A1* | 7/2018 | Sandeep | G09C 1/00 |
| 2018/0218157 A1* | 8/2018 | Price | H04L 63/1433 |
| 2018/0240112 A1* | 8/2018 | Castinado | G06Q 20/065 |
| 2018/0248863 A1* | 8/2018 | Kao | H04L 63/102 |
| 2018/0253737 A1* | 9/2018 | Hanis | G06Q 30/0185 |
| 2018/0277246 A1* | 9/2018 | Zhong | A61B 5/4833 |
| 2018/0288060 A1* | 10/2018 | Jackson | H04L 63/107 |
| 2018/0309752 A1* | 10/2018 | Villavicencio | H04L 63/1433 |
| 2018/0337914 A1* | 11/2018 | Mohamad Abdul | H04L 9/3213 |
| 2018/0351944 A1* | 12/2018 | Cho | H04L 9/3271 |
| 2018/0375886 A1* | 12/2018 | Kirti | H04L 63/1425 |
| 2019/0044978 A1* | 2/2019 | Barday | G06F 21/552 |
| 2019/0068604 A1* | 2/2019 | Legault | H04L 63/08 |
| 2019/0080189 A1* | 3/2019 | Van Os | H04N 23/611 |
| 2019/0087822 A1* | 3/2019 | Vasu | G06Q 20/4016 |
| 2019/0096217 A1* | 3/2019 | Pourmohammad | G06F 40/30 |
| 2019/0124097 A1* | 4/2019 | Thomas | G06F 21/44 |
| 2019/0138512 A1* | 5/2019 | Pourmohammad | G06Q 10/0635 |
| 2019/0138727 A1* | 5/2019 | Dontov | G06F 11/1464 |
| 2019/0156191 A1* | 5/2019 | Cordes | G08B 21/182 |
| 2019/0228140 A1* | 7/2019 | Arroyo | G06F 21/32 |
| 2019/0312839 A1* | 10/2019 | Grimm | H04L 63/20 |
| 2019/0318358 A1* | 10/2019 | Chamberlain | G06Q 20/3223 |
| 2019/0319987 A1* | 10/2019 | Levy | H04L 63/08 |
| 2019/0349770 A1* | 11/2019 | Andres | H04W 12/08 |
| 2019/0387021 A1 | 12/2019 | Wyatt et al. | |
| 2019/0392173 A1* | 12/2019 | Brannon | G06F 21/6245 |
| 2019/0392177 A1* | 12/2019 | Brannon | G06F 21/6263 |
| 2020/0004968 A1* | 1/2020 | Brannon | G06F 21/577 |
| 2020/0004985 A1* | 1/2020 | Brannon | G06F 40/174 |
| 2020/0012814 A1* | 1/2020 | Brannon | G06F 21/6245 |
| 2020/0012978 A1* | 1/2020 | Brannon | G06Q 10/067 |
| 2020/0019905 A1* | 1/2020 | Shin | G06V 10/17 |
| 2020/0021620 A1* | 1/2020 | Purathepparambil | H04L 63/102 |
| 2020/0042723 A1* | 2/2020 | Krishnamoorthy | G06F 21/45 |
| 2020/0045064 A1* | 2/2020 | Bindal | G06N 20/00 |
| 2020/0074059 A1* | 3/2020 | Beckett, Jr. | G06F 21/36 |
| 2020/0090510 A1* | 3/2020 | Nagarajan | G08G 1/096716 |
| 2020/0127858 A1* | 4/2020 | Stöhr | H04L 63/0853 |
| 2020/0137097 A1 | 4/2020 | Zimmermann et al. | |
| 2020/0210622 A1* | 7/2020 | Brannon | G06F 21/6245 |
| 2020/0220876 A1* | 7/2020 | Suzuki | G06Q 20/321 |
| 2020/0220901 A1* | 7/2020 | Barday | G06F 21/552 |
| 2020/0242254 A1* | 7/2020 | Velur | G06F 21/552 |
| 2020/0264598 A1* | 8/2020 | Sheng | G05B 23/0283 |
| 2020/0272717 A1* | 8/2020 | Figueredo de Santana | G06V 40/172 |
| 2020/0285770 A1* | 9/2020 | Brannon | G06F 21/6245 |
| 2020/0304503 A1* | 9/2020 | Zerrad | H04W 12/67 |
| 2020/0334365 A1* | 10/2020 | Buck | G06F 21/604 |
| 2020/0364369 A1* | 11/2020 | Brannon | G06F 21/33 |
| 2021/0004356 A1* | 1/2021 | Trim | G06F 40/197 |
| 2021/0004808 A1* | 1/2021 | Goyal | G06Q 20/4016 |
| 2021/0004809 A1* | 1/2021 | Goyal | G06N 20/00 |
| 2021/0056477 A1* | 2/2021 | Ahire | G06Q 10/0635 |
| 2021/0059616 A1* | 3/2021 | Abrol | A61B 5/0022 |
| 2021/0135943 A1* | 5/2021 | Andrews | H04L 41/0893 |
| 2021/0157933 A1* | 5/2021 | Turano | G06F 21/604 |
| 2021/0182863 A1* | 6/2021 | Doraiswamy | G06Q 20/02 |
| 2021/0197720 A1* | 7/2021 | Houston | G06N 3/045 |
| 2021/0200902 A1* | 7/2021 | Brannon | G06F 21/6263 |
| 2021/0211349 A1* | 7/2021 | Grant | H04L 41/0866 |
| 2021/0232687 A1* | 7/2021 | Sasaki | H04L 67/12 |
| 2021/0233654 A1* | 7/2021 | Arthur | G06Q 10/063114 |
| 2021/0240838 A1* | 8/2021 | Sasaki | G08G 1/052 |
| 2021/0241871 A1* | 8/2021 | Burnett | G16H 70/60 |
| 2021/0266294 A1* | 8/2021 | Chechik | H04L 51/222 |
| 2021/0266310 A1* | 8/2021 | Moore | H04L 63/0227 |
| 2021/0276270 A1* | 9/2021 | Luan | B29C 64/165 |
| 2021/0280027 A1* | 9/2021 | Wen | G07G 1/0054 |
| 2021/0312441 A1* | 10/2021 | Dawson, V | H04L 63/105 |
| 2021/0350022 A1* | 11/2021 | Brannon | G06F 40/174 |
| 2021/0385069 A1* | 12/2021 | Reid | H04L 9/3239 |
| 2021/0397903 A1* | 12/2021 | Raj | G06Q 10/0635 |
| 2021/0406398 A1* | 12/2021 | Brannon | H04L 63/102 |
| 2022/0030382 A1* | 1/2022 | Klasson | G06N 20/00 |
| 2022/0035952 A1* | 2/2022 | Brannon | G06F 21/6245 |
| 2022/0051802 A1* | 2/2022 | Fong | G16H 10/60 |
| 2022/0068480 A1* | 3/2022 | Manzi | G06T 7/0012 |
| 2022/0103318 A1* | 4/2022 | Ramasamy | G06Q 20/4016 |
| 2022/0108701 A1* | 4/2022 | Gupta | G06F 21/32 |
| 2022/0121777 A1* | 4/2022 | Brannon | G06F 21/6245 |
| 2022/0157141 A1* | 5/2022 | Hasan | G08B 29/188 |
| 2022/0157147 A1* | 5/2022 | Hasan | G08B 26/008 |
| 2022/0171856 A1* | 6/2022 | Bhatt | G06F 21/577 |
| 2022/0182379 A1* | 6/2022 | Budman | G06F 21/316 |
| 2022/0239689 A1* | 7/2022 | Kaidi | H04L 63/083 |
| 2022/0275966 A1* | 9/2022 | Schoch | G08B 21/12 |
| 2022/0277103 A1* | 9/2022 | Brannon | G06F 21/6245 |
| 2022/0303289 A1* | 9/2022 | Townsend | H04L 67/02 |
| 2022/0329612 A1* | 10/2022 | Verma | H04L 63/1425 |
| 2022/0395236 A1* | 12/2022 | Buddi | A61B 5/7275 |
| 2022/0400965 A1* | 12/2022 | Schneider | A61B 5/7275 |
| 2022/0407893 A1* | 12/2022 | Maiman | H04W 12/06 |
| 2022/0414662 A1* | 12/2022 | Cao | G06Q 20/4016 |
| 2022/0414665 A1* | 12/2022 | Gelda | G06Q 20/4016 |

OTHER PUBLICATIONS

Gkroumas et al ("Cross Network Behavioral Clustering for Managed Security Service Providers," 14th International Conference on Network and Service Management (CNSM 2018), pp. 37-44 (Year: 2018).*

Anikin "Information Security Risk Assessment and Management Method in Computer Networks," 2015 International Siberian Conference on Control and Communications (SIBCON), pp. 1-5 (Year: 2015).*

Rezvani et al "Iterative Security Risk Analysis for Network Flows Based on Provenance and Interdependency," 2013 IEEE International Conference on Distributed Computing in Sensor Systems, pp. 286-288 (Year: 2013).*

Crandall "Risk Assessments: A Weighted Score Approach to Improving Risk Management Decisions," 2020 Intermountain Engineering, Technology and Computing (IETC), pp. 1-5, (Year: 2020).*

Khodabacchus et al "Risk Score Calculation for Cloud Biometric Authentication," 2016 IEEE International Conference on Emerging

(56) References Cited

OTHER PUBLICATIONS

Technologies and Innovative Business Practices for the Transformation of Societies (EmergiTech), pp. 1-4 (Year: 2016).*

* cited by examiner

| Risk Scores | 1 | 2 | 3 | 4 | 5 |
|---|---|---|---|---|---|
| Example 1 | A | B | C | D | E |
| Example 2 | 20 | 40 | 60 | 80 | 100 |
| Example 3 | True | | | | False |
| Example 4 | Safe | Slightly Safe | Low Risk | Medium Risk | High Risk |

SYSTEMS AND METHODS FOR NETWORK SECURITY

FIELD OF THE INVENTION

The present disclosure relates generally to network security technology, and more particularly, to systems and methods of network security for preventing and reducing risk of unauthorized access.

BACKGROUND

Network security is becoming increasingly challenging. For example, wireless or WIFI networks are publically discoverable by any device picking up the signal of that network. Even though those networks are secured by personalized passwords, the fact that they are publically available renders those networks vulnerable. If someone is trying to gain access to a network, that person can search for a network signal and try to access it by guessing the password of that network.

However, with enough attempts, it is likely a hacker or an otherwise unauthorized person can overcome basic security protections and gain access to the network. Once the network has been accessed, the hacker or unauthorized person can compromise network and data security, take unauthorized actions, and cause damage to the other users' accounts or to the entity that owns or operates the network. Particularly, with the expanding Internet of Things (IoT) and the increasing connectedness of applicants and other products to networks, network vulnerabilities are increasing and unauthorized network access may cause significant damage in a number of ways.

Accordingly, there is a need to provide systems and methods of enhancing network security for detecting unauthorized access attempts and preventing damages from occurring to the networks.

SUMMARY

Embodiments of the present disclosure provide a security system for a network. The security system comprises: a processor; and a memory storing instructions executable by the processor. Upon execution of the instructions by the processor, the processor is configured to: detect one or more failed authentication attempts to access the network by at least one user device; determine a number of the one or more failed authentication attempts; determine a first risk score for the at least one user device based on the number of the one or more failed authentication attempts; determine whether the first risk score of the at least one user device is equal to or greater than a first risk score threshold; in response to a determination that the first risk score of the at least one user device is equal to or greater than the first risk score threshold, generate a first notification indicating that the at least one user device is attempting to gain unauthorized access onto the network; transmit the first notification to an administrator of the network; determine whether the at least one user device is successfully authenticated to access the network after the number of the one or more failed authentication attempts have been detected; and in response to a determination that the at least one user device is successfully authenticated to access the network after the number of the one or more failed authentication attempts have been detected, apply a first set of network activity restrictions to the at least one user device, such that the at least one user device is restricted to access the network under the first set of network activity restrictions.

Embodiments of the present disclosure provide a method for network security. The method comprises: detecting, by a server, one or more failed authentication attempts to access a network by at least one user device; determining, by the server, a number of the one or more failed authentication attempts; determining, by the server, a first risk score for the at least one user device based on the number of the one or more failed authentication attempts; determining, by the server, whether the first risk score of the at least one user device is equal to or greater than a first risk score threshold; in response to a determination that the first risk score of the at least one user device is equal to or greater than the first risk score threshold, generating, by the server, a first notification indicating that the at least one user device is attempting to gain unauthorized access onto the network; transmitting, by the server, the first notification to an administrator of the network; determining, by the server, whether the at least one user device is successfully authenticated to access the network after the number of the one or more failed authentication attempts have been detected; and in response to a determination that the at least one user device is successfully authenticated to access the network after the number of the one or more failed authentication attempts have been detected, applying, by the server, a first set of network activity restrictions to the at least one user device, such that the at least one user device is restricted to access the network under the first set of network activity restrictions.

Embodiments of the present disclosure provide a non-transitory computer-accessible medium having stored thereon computer-executable instructions for providing network security. The computer arrangement is configured to perform procedures comprising: detecting one or more failed authentication attempts to access a network by at least one user device; determining a number of the one or more failed authentication attempts; determining a first risk score for the at least one user device based on the number of the one or more failed authentication attempts; determining whether the first risk score of the at least one user device is equal to or greater than a first risk score threshold; in response to a determination that the first risk score of the at least one user device is equal to or greater than the first risk score threshold, generating a first notification indicating that the at least one user device is attempting to gain unauthorized access onto the network; transmitting the first notification to an administrator of the network; determining whether the at least one user device is successfully authenticated to access the network after the number of the one or more failed authentication attempts have been detected; and in response to a determination that the at least one user device is successfully authenticated to access the network after the number of the one or more failed authentication attempts have been detected, applying a first set of network activity restrictions to the at least one user device, such that the at least one user device is restricted to access the network under the first set of network activity restrictions.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

FIG. 6 is a table illustrating example risk scores according to an example embodiment.

DETAILED DESCRIPTION OF EXAMPLE EMBODIMENTS

Figure 1:
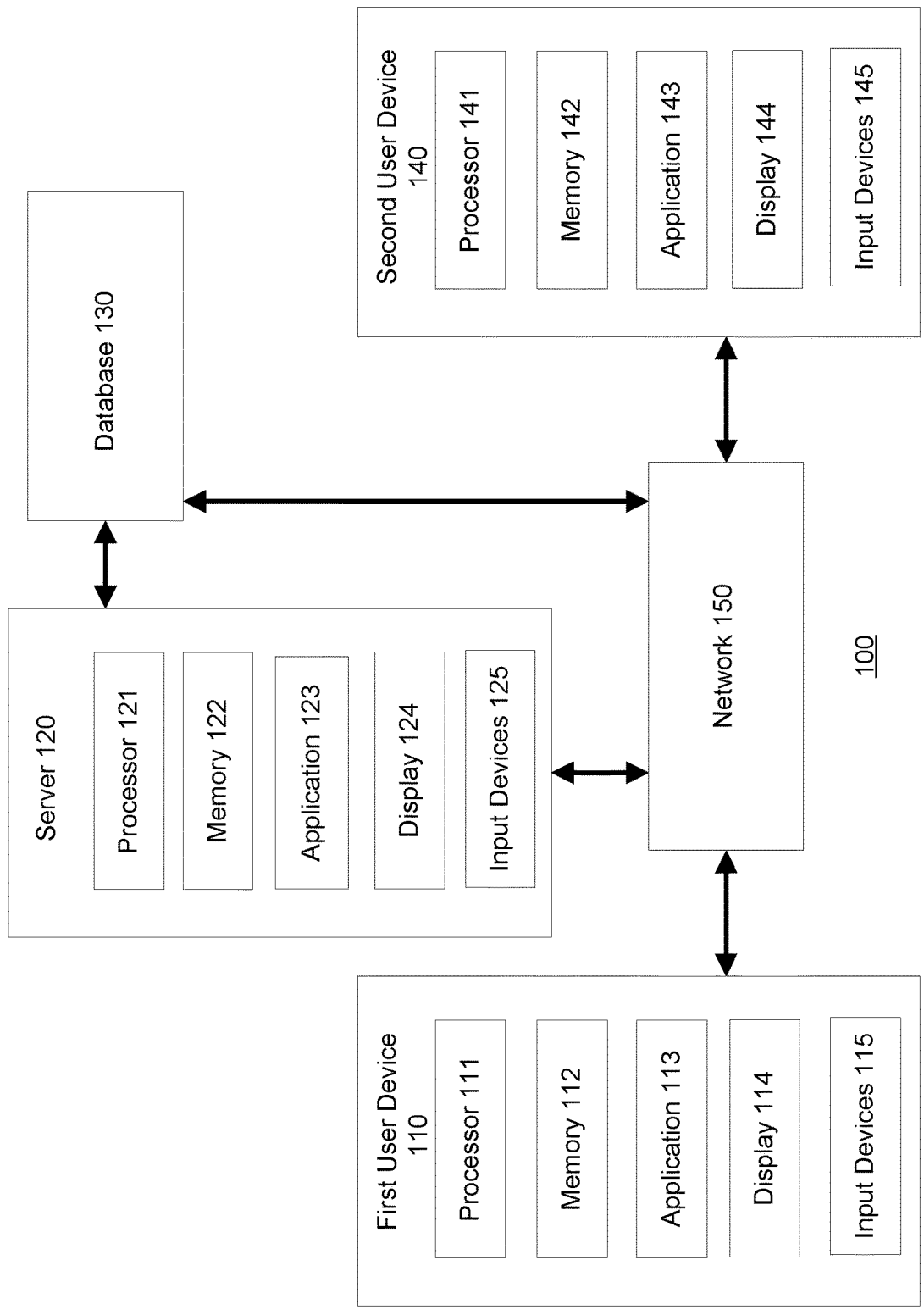
FIG. 1 is a diagram of a system for network security according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

In order to reduce the chances that hackers or unauthorized actors can access a network without permission, an application programming interface (API) may be used to alert an administrator of the network if a user attempts to sign in to the network and gets the password wrong. The hackers or unauthorized actors may try to, for example, gain network access by submitting multiple password attempts from one or more devices. In other examples, hackers or unauthorized actors may try to overcome password security by brute force attacks, phishing attacks, sniffing, or by obtaining compromised credentials. If, and when, alerted to such activities, the administrator of the network may take some precautions. For example, the administrator may change passwords or increase the password security requirements. The administrator may freeze accounts if the administrator determines there is a vulnerability. In some embodiments, the API may be directed to freeze the network owner's account for a certain amount of time to prevent unauthorized access and activity.

The administrator of the network may implement additional security controls. For example, the administrator may set up a network module including the API that tracks failed authentication attempts per device so the device can be identified by a media access control address (MAC) of the device or an Internet protocol (IP) address of the device. The module may be configured to track and count the number of failed password attempts. And each one of those failed attempts would modify a calculated risk score that is assigned at the device level. For example, every device may first be assigned a neutral risk score. If a device misspells a password once, the risk score associated with that device can go down a certain amount. If that device continues to misspell passwords, the risk score associated with that device continues to drop. When the risk score is above a certain risk score threshold, the administrator of the network may be notified that a new party is attempting to gain unauthorized access onto the network. As such, the administrator can be alerted in advance without waiting until a hacker or unauthorized actor is on the network.

The risk score threshold can be a number or a numerical range. For example, on a scale of 1 through 100 for risk score, if a device with a risk score below 30 or 50 is attempting multiple authentication attempts, then the administrator of the network may be notified. In some embodiments, a bad actor may not be using one machine to try to access a network, and may be using many machines trying to access the network. In such scenarios, a multi-device implementation of this disclosure may be used. For example, if a collective number of lower risk devices are together creating a cumulatively significant risk event, for example, clusters of bad login attempts or failed login attempts within a time window, which can be a trigger for notifying the administrator of the network. The time window could be a couple of minutes, a couple of hours, or one day.

In some embodiments, predefined network restrictions may be applied to devices when hackers gets onto the network using the devices, in addition to notifying the administrator of the network. For example, if a device successfully authenticates when the risk score of that device is above a certain risk score threshold, restricted network settings can be enforced on that device. The restriction settings may include, but not be limited to, throttling the network connection of that device so that its network connection is slow and it is more time-consuming, difficulty, and/or impossible to perform certain actions, restricting the IP address that that device is allowed to ping so that device cannot go to certain sites, and limiting that device's ability to adjust settings on the network.

The invention disclosed herein may embody a third-party module including APIs that can be downloaded and configured on a network. The module may embedded on a network hardware device, such as modems and routers. The module can be stored in memory on that network device, such as firmware. Alternatively, the module may be downloadable and then implemented as a network security layer.

Accordingly, the present disclosure advantageously maintains and promotes network security, which in turn increases data security, security of operations, and reduces the potential for hackers or unauthorized actors to cause damage or disruption legitimate network activity. In addition to these benefits, the present disclosure allows for the efficient monitoring of networks and access attempts and can reduce the resources (e.g., network system resources as well as time, cost, and personnel) necessary to perform these functions. Thus, a higher level of network security and operation continuity can be obtained while conserving resources and potentially allocating the conserved resources to other activities.

FIG. 1 illustrates a system 100 for network security according to an example embodiment. As further discussed below, the system 100 may include a first user device 110, a server 120, a database 130, and a second user device 140 in communication with one another using a network 150. Although FIG. 1 illustrates single instances of the components, the system 100 may include any number of components.

The first user device 110 may be configured to have a web browser in which a browser extension may be installed and/or a mobile application installed thereon. A user (e.g., an administrator or owner of a network) may use the web browser or the mobile application on the first user device 110 to communicate with the server 120. The server 120 may be associated with the network for managing the network and be configured to receive data from the first user device 110 and the second user device 140. The second user device 140 may a device used by a bad actor to perform unauthorized attempts to access the network. The database 130 may contain data associated with the network.

The first user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first user device 110 may include a processor 111, a memory 112, and an application 113. The processor 111 may be a processor, a microprocessor, or other processor, and the first user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 112 may be configured to store one or more software applications, such as the application 113, and other data, such as user's private data and financial account information.

The application 113 may comprise one or more software applications, such as a mobile application and a web browser, comprising instructions for execution on the first user device 110. In some examples, the first user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The first user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein.

The server 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include a processor 121, a memory 122, and an application 123. The processor 121 may be a processor, a microprocessor, or other processor, and the server 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the server 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 122 may be configured to store one or more software applications, such as the application 123, and other data, such as user's private data and financial account information.

The application 123 may comprise one or more software applications comprising instructions for execution on the server 120. In some examples, the server 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the application 123 may be executed to perform transmitting an alert notification to the first user device 110, tracking authentication attempts from the second user device 140, determining a risk score for the second user device 140, and applying a set of network activity restrictions to the second user device 140. Such processes may be implemented in software, such as software modules, for execution by computers or other machines. The application 123 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the server 120 that is available and supported by the server 120, such as a touch-screen, keyboard, mouse, cursor-control device, touch-screen, microphone, digital camera, video recorder or camcorder. These devices may be used to enter information and interact with the software and other devices described herein.

The database 130 may be one or more databases configured to store data, including without limitation, private data of users, financial accounts of users, identities of users, transactions of users, risk scores of devices, failed authentication attempts of devices, sets of network restrictions applicable to devices, and certified and uncertified documents. The database 130 may comprise a relational database, a non-relational database, or other database implementations, and any combination thereof, including a plurality of relational databases and non-relational databases. In some examples, the database 130 may comprise a desktop database, a mobile database, or an in-memory database. Further, the database 130 may be hosted internally by the server 120 or may be hosted externally of the server 120, such as by a server, by a cloud-based platform, or in any storage device that is in data communication with the server 120.

The second user device 140 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second user device 140 may include a processor 141, a memory 142, and an application 143. The processor 141 may be a processor, a microprocessor, or other processor, and the second user device 140 may include one or more of these processors. The processor 141 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 141 may be coupled to the memory 142. The memory 142 may be a read-only memory, write-once read-multiple memory or read/write memory, e.g., RAM, ROM, and EEPROM, and the second user device 140 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times. The memory 142 may be configured to store one or more software applications, such as the application 143, and other data, such as user's private data and financial account information.

The application 143 may comprise one or more software applications comprising instructions for execution on the second user device 140. In some examples, the second user device 140 may execute one or more applications, such as software applications, that enable, for example, network communications with one or more components of the system 100, transmit and/or receive data, and perform the functions described herein. Upon execution by the processor 141, the application 143 may provide the functions described in this specification, specifically to execute and perform the steps and functions in the process flows described below. Such processes may be implemented in software, such as software modules, for execution by computers or other machines. The application 143 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The second user device 140 may further include a display 144 and input devices 145. The display 144 may be any type of device for presenting visual information such as a computer monitor, a flat panel display, and a mobile device screen, including liquid crystal displays, light-emitting diode displays, plasma panels, and cathode ray tube displays. The input devices 145 may include any device for entering information into the second user device 140 that is available and supported by the second user device 140, such as a touch-screen, keyboard, mouse, cursor-control device, touch-screen, microphone, digital camera, video recorder or camcorder. These devices may be used to enter information and interact with the software and other devices described herein.

The system 100 may include one or more networks 150. In some examples, the network 150 may be one or more of a wireless network, a wired network or any combination of wireless network and wired network, and may be configured to connect the first user device 110, the server 120, the database 130 and the second user device 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

As used herein, the network 150 may be a wired network or a wireless network (e.g., WIFI), and the administrator of the network 150 may be an owner and/or operator of the network 150. In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the first user device 110, the server 120, the database 130, and the second user device 140 using the network 150 may occur using one or more front channels and one or more secure back channels. A front channel may be a communication protocol that employs a publicly accessible and/or unsecured communication channel such that a communication sent to the first user device 110, the server 120, the database 130, and/or the second user device 140 may originate from any other device, whether known or unknown to the first user device 110, the server 120, the database 130, and/or the second user device 140, if that device possesses the address (e.g., network address, Internet Protocol (IP) address) of the first user device 110, the server 120, the database 130, and/or the second user device 140. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the first user device 110, the server 120, the database 130, and/or the second user device 140 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

Figure 2:
FIG. 2 is a sequence chart illustrating a method of network security according to an example embodiment.

FIG. 2 illustrates a sequence diagram 200 of network security according to an example embodiment. FIG. 2 may reference the same or similar components as those illustrated in FIG. 1, including a first user device, a server, a database, a second user device and a network.

In step 210, the first user device 110 may perform one or more authentication attempts of accessing a network associated with the server 120. When the network is publically discoverable, for example, a WIFI signal, a user of the first user device 110 may try to gain access to the network through searching for the WIFI signal. The user of the first user device 110 may be a bad actor. As used herein, a bad actor can be a user who is attempting to gain access onto the network without prior permission of the owner or administrator of the network, e.g., a hacker or an unauthorized actor. The prior permission may include a login credential (e.g., password) verified, authenticated, or approved by the owner or administrator of the network.

In step 215, the server 120 may detect and store failed authentication attempts of accessing the network by the first user device 110. For example, the user of the first user device 110 may randomly guess passwords for logging onto the network. As another example the user of the first user device 110 may guess passwords using information obtained in an unauthorized way, e.g., from phishing attacks, data breaches, and packet capture. The server 120 may monitor and detect the authentication attempts tried by the user of the first user device 110, for example, by identifying the first user device 110 using a MAC address of the first user device 110. The server 120 may also save the failed authentication attempts into the database 130. The database 130 may further contain personal data of authorized users of the network, such as names, home addresses, phone numbers, dates of birth, logging credentials, and financial accounts. The database 130 may further store successful access attempts and a history of network activities performed by authorized users and bad actors.

In step 220, the server 120 may track and count the failed authentication attempts from the first user device 110 to determine a number of the failed authentication attempts and may further maintain a counter for failed authentication attempts. The server 120 may store the determined number or counter in the database and associate it with the first user device 110.

In step 225, the server 120 may determine a first risk score for the first user device 110 based on the determined number of the failed authentication attempts. The first risk score may be determined based solely on the determined number of the failed authentication attempts. For example, one score may be assigned to one failed authentication attempt (e.g., 1 score=1 failed authentication), or a half score may be assigned to one failed authentication (e.g., 0.5 score=1 failed authentication), and so forth. In such case, the first risk score may correspond to or be associated with the number of failed authentication attempts. For example, if there are 20 failed authentication attempts, the first risk score may be determined to be 20.

In addition, the first risk score may be determined based on the determined number of failed authentication attempts and other factors as well (which will be described below). Further, the server 120 may store the determined first risk score in the database 130.

In step 230, the server 120 may determine whether the first risk score of the first user device 110 is equal to or greater than a first risk score threshold. For example, the first risk score threshold may be 10, so the determined first risk score (20) of the first user device 110 is greater than the first risk score threshold (10). The first risk score threshold may a neutral number (e.g., 5) or a neutral number within a range (e.g., 5 out of 10) assigned to the first user device 110. The first user device 110 may be categorized as a low risk device if the determined first risk score is less than the neutral number, and may be categorized as a high risk device if the determined first risk score is equal to or greater than the neutral number. In some examples, the first risk score threshold can be a Boolean value.

In step 235, when the first risk score of the first user device 110 is determined to be equal to or greater than the first risk score threshold, the server 120 may generate a first notification indicating that the first user device 110 is attempting to gain unauthorized access onto the network. The server 120 may store the first notification in the database 130 and associate it with the first user device 110.

In step 240, the server 120 may transmit the first notification to an administrator or owner of the network. The administrator may use the second user device 140, so the first notification may be transmitted to the second user device 140 to alert the administrator. The administrator may perform some actions based on the first notification, for example, changing the login password of the network.

In some embodiments, the first user device 110 may eventually successfully log onto the network after many failed authentication attempts, for example, by guessing the network login password correctly. In step 245, the server 120 may determine that the first user device 110 is successfully authenticated to access the network after the number of the failed authentication attempts have been detected.

Upon the determination by the server 120 that the first user device 110 is successfully authenticated to access the network after the number of the failed authentication attempts have been detected, in step 250, the server 120 may apply a first set of network activity restrictions or security control to the first user device 110 to restrict network activities that the first user device 110 can perform on the network.

The first set of network activity restrictions or security control may be predefined by the administrator or owner of the network. The first set of network activity restrictions may include limiting the abilities of the first user device 110 for changing user types or perform any admin changes. For example, the first user device 110 may not be allowed to: change a password on the network; change settings relating to the first user device 110; change settings relating to the network; access certain categories or types of data; access certain files or folders; edit data, files, or folders; delete data, files, or folders; move data, files, or folders; download data, files, or folders; and/or invite additional users to login onto the network. With the first set of network activity restrictions placed on the first user device 110, potential damages caused by the first user device 110 can be reduced and/or eliminated.

In some embodiments, multiple first user devices 110 may be used by the bad actor. If the bad actor guesses the network password correctly once, he/she can then share the network password among the multiple first user devices 110 or authenticate on other devices. By applying the first set of network activity restrictions on one of the multiple first user devices 110 that authenticates onto the network, the others of the multiple first user devices 110 can be restricted from being authenticated onto the network.

Alternatively, upon the determination by the server 120 that the first user device 110 is successfully authenticated to access the network after the number of the failed authentication attempts have been detected, the server 120 may perform some actions to block or remove the first user device 110 from the network.

Figure 3:
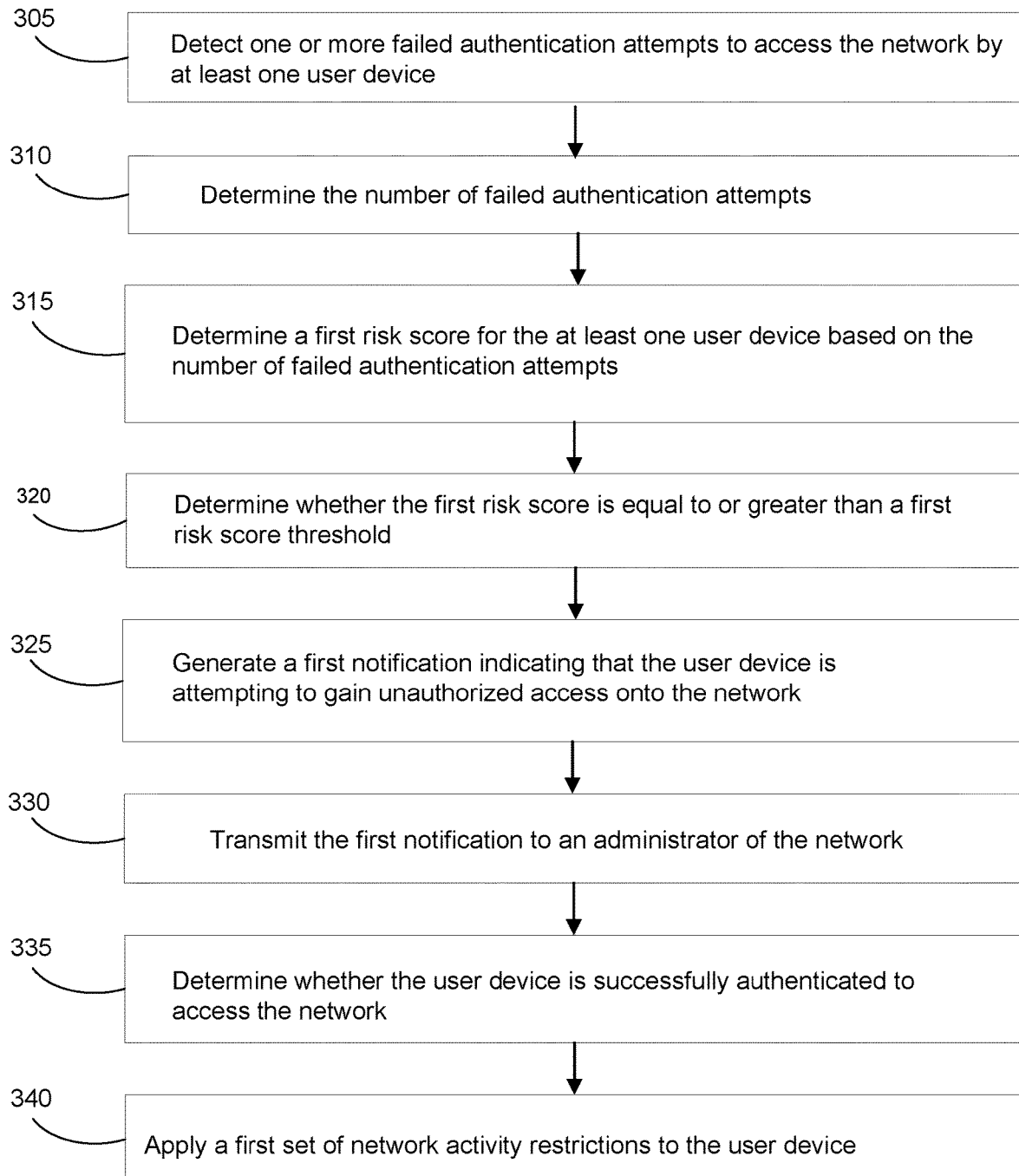
FIG. 3 is a flow chart illustrating a method of network security according to an example embodiment.

FIG. 3 illustrates a flow chart for a method 300 of network security according to an example embodiment. FIG. 3 may reference the same or similar components as those illustrated in FIG. 1 and FIG. 2, including, a first user device, a server, a database, a second user device, and a network. The method 300 may be implemented in the system 100 and may comprise the following steps.

In step 305, the server 120 may detect one or more failed authentication attempts to access the network by at least one user device. The at least one user device may include the first user device 110. The network may be at least one selected from the group of a wireless network and a wired network. The at least one user device may be identified by at least one selected from the group of a MAC address of the at least one user device and an IP address of the at least one user device.

In step 310, the server 120 may determine a number of the one or more failed authentication attempts. The server 120 may track and count how many failed authentication attempts have been detected from the at least one user device. The server 120 may further store the number of the one or more failed authentication attempts in the database 130.

In step 315, the server 120 may determine a first risk score for the at least one user device based on the number of the one or more failed authentication attempts. The first risk score for the at least one user device may be determined based on the number of the one or more failed authentication attempts and other factors, which will be described with reference to FIG. 5.

In step 320, the server 120 may determine whether the first risk score of the at least one user device is equal to or greater than a first risk score threshold. The first risk score threshold may be a numerical value or a Boolean value (e.g., true or false) depending on the first risk score of the at least one user device.

In step 325, in response to a determination that the first risk score of the at least one user device is equal to or greater than the first risk score threshold, the server 120 may generate a first notification indicating that the at least one user device is attempting to gain unauthorized access onto the network. The server 120 may further store the first notification in the database 130.

In step 330, the server 120 may transmit the first notification to an administrator or owner of the network. For example, the administrator or owner of the network may be associated with the second user device 140. The server 120 may then transmit the first notification to the second user device 140 to alert the administrator or owner of the network. The first notification may be a text message including the MAC and/or IP address of the at least one user device.

In some embodiments, in response to the determination that the first risk score of the at least one user device is equal to or greater than the first risk score threshold, the server 120 may generate a second notification indicating that the at least one user device is attempting to gain unauthorized access onto the network, and then transmit the second notification to an external party other than the administrator of the network.

The external party may include, but not limited to, police, FBI, banks of the owner or administrator of the network, a third-party security provider, or any other party who would care about the network security. For example, the server 120 may send an API call to the banks of the owner or administrator of the network to have the financial accounts of the owner or administrator restricted, frozen and/or canceled.

In step 335, the server 120 may determine whether the at least one user device is successfully authenticated to access the network after the number of the one or more failed authentication attempts have been detected. The server 120 may continue to detect and monitor the at least one user device after the first and/or second notification is transmitted. The at least one user device may continue the authentication attempts until the at least one user device is successfully authenticated to access the network.

In step 340, in response to a determination that the at least one user device is successfully authenticated to access the network after the number of the one or more failed authentication attempts have been detected, the server 120 may apply a first set of network activity restrictions to the at least one user device, such that the at least one user device is restricted to access the network under the first set of network activity restrictions.

The first set of network activity restrictions may include, but not limited to, reducing network connection speed of the at least one user device, restricting IP addresses that the at least one user is allowed to ping, and limiting ability of the at least one user device to adjust settings of the network.

Figure 4:
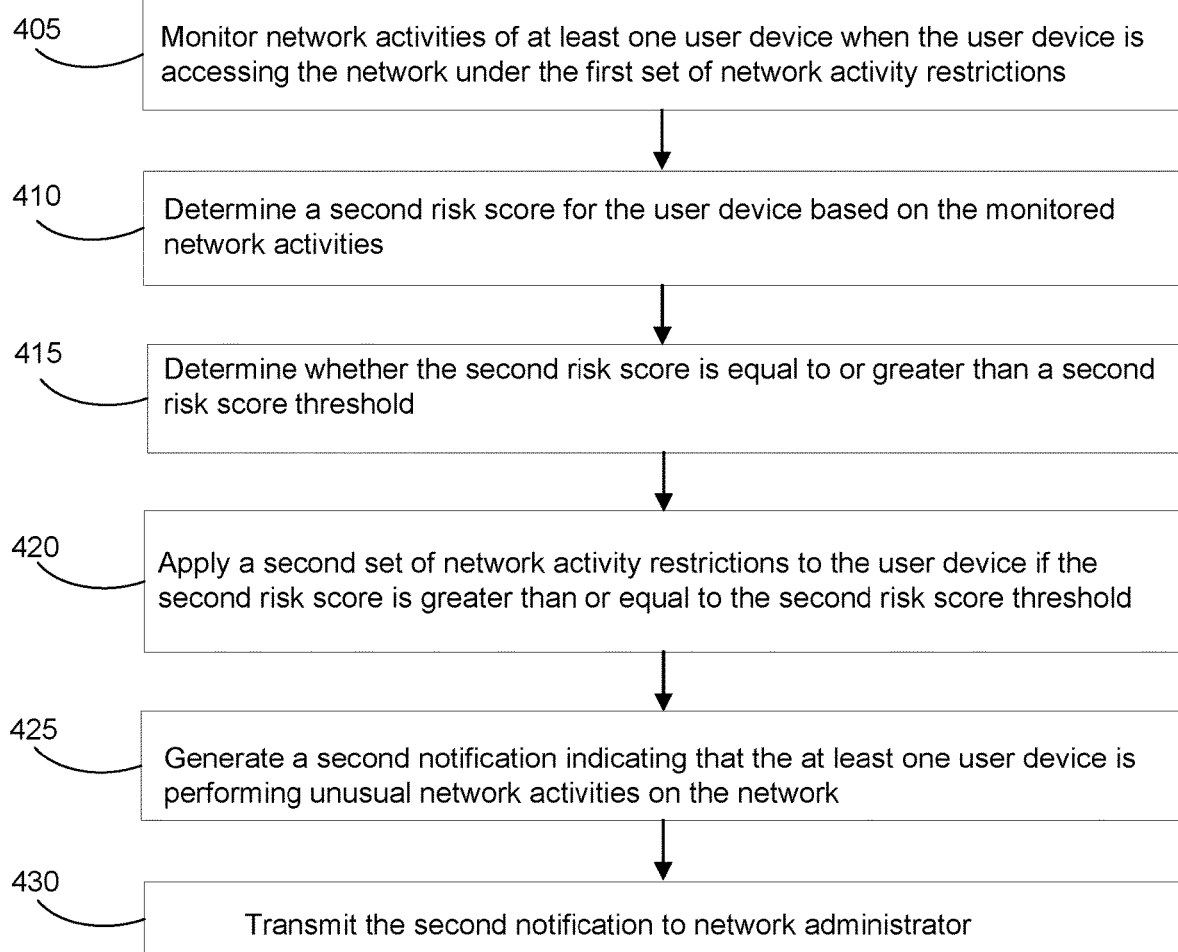
FIG. 4 is a flow chart illustrating a method of network security according to an example embodiment.

FIG. 4 illustrates a flow chart for a method 300 of network security according to an example embodiment. FIG. 4 may reference the same or similar components as those illustrated in FIG. 1, FIG. 2 and FIG. 3, including, a first user device, a server, a database, a second user device, and a network. The method 400 may be implemented in the system 100 and may comprise the following steps.

As described above, the first user device 110 may be successfully authenticated after many failed authentication attempts. Instead of removing the first user device 110 from the network after the first user device 110 successfully logs onto the network, in step 405, the server 120 may monitor network activities of the at least one user device (e.g., the first user device 110) when the at least one user device is accessing the network under the first set of network activity restrictions.

The monitored network activities of the at least one user device may include, but not limited to, downloading a large amount of data, exporting a large amount of data outside of the network, visiting an unexpected website, and visiting a restricted website.

In step 410, the server 120 may determine a second risk score for the at least one user device based on the monitored network activities. The second risk score may be determined in a similar method as the first risk score. The second risk score may also referred to as a post-authentication risk score.

In step 415, the server 120 may determine whether the second risk score is equal to or greater than a second risk score threshold. The second risk score threshold may be a numerical value or a Boolean value (e.g., true or false) depending on the second risk score of the at least one user device.

In step 420, When the second risk score is determined to be equal to or greater than the second risk score threshold, the server 120 may apply a second set of network activity restrictions to the at least one user device, such that the at least one user device is restricted to access the network under the second set of network activity restrictions. The second set of network activity restrictions may be same as, similar to, or different than the first set of network activity restrictions. The second set of network activity restrictions may include disconnecting the at least one user device from the network.

In step 425, the server 120 may generate a notification indicating that the at least one user device is performing unusual network activities on the network. The server 120 may further store the notification in the database 130.

In step 430, the server 120 may transmit the notification to the administrator of the network. For example, the administrator or owner of the network may be associated with the second user device 140. The server 120 may then transmit the notification to the second user device 140 to alert the administrator or owner of the network. The notification may be a text message including the MAC and/or IP address of the at least one user device.

Figure 5:
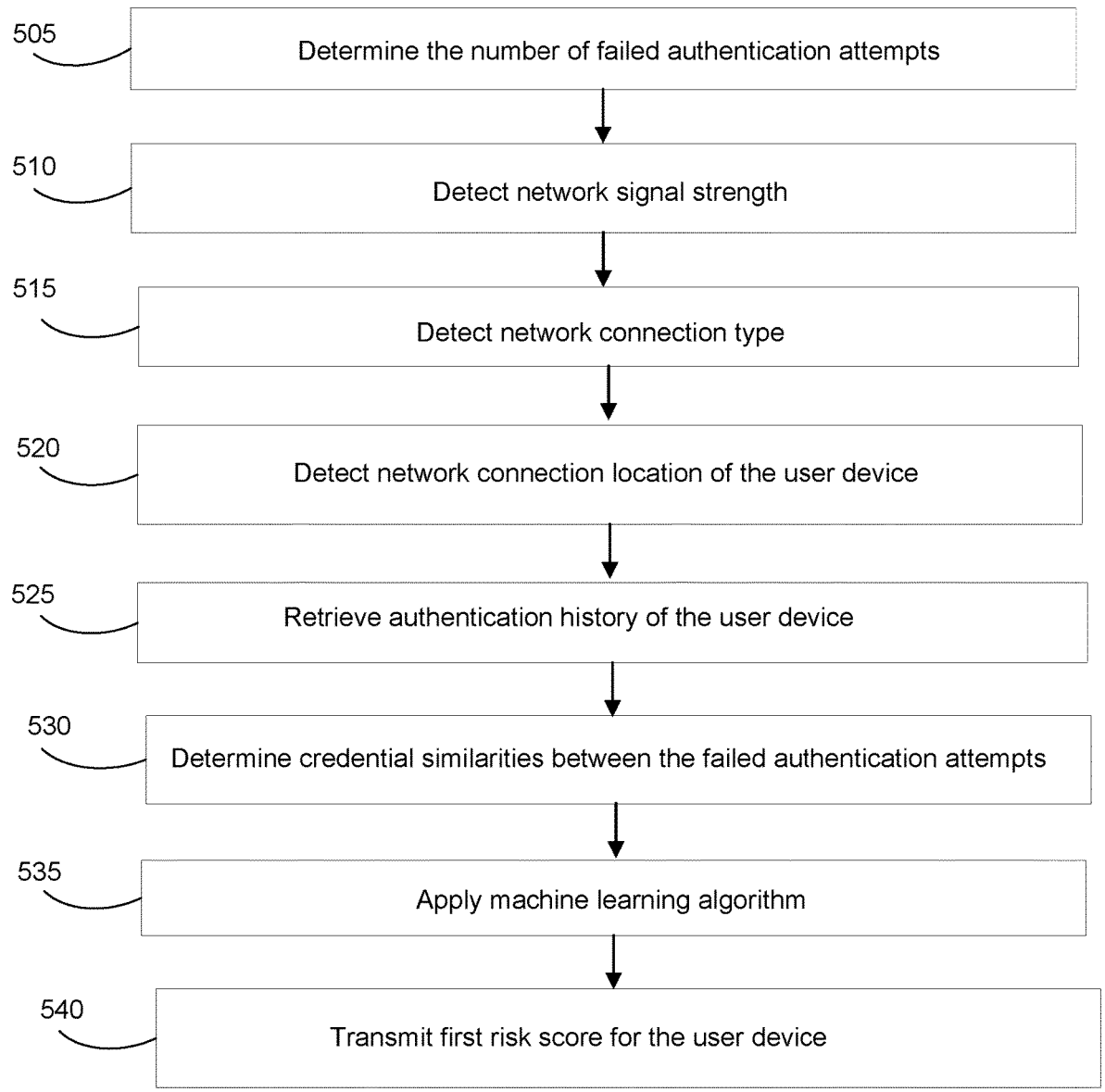
FIG. 5 is a flow chart illustrating a method of determining a risk score according to an example embodiment.

FIG. 5 illustrates a flow chart for a method 500 of determining the first risk score according to an example embodiment. FIG. 5 may reference the same or similar components as those illustrated in FIG. 1, FIG. 2, FIG. 3 and FIG. 4 including, a first user device, a server, a database, a second user device, and a network. The method 500 may be implemented in the system 100 and may comprise the following steps.

In step 505, the server 120 may receive the number of failed authentication attempts. As described above, the server 120 may track and count the number of failed authentication attempts by the first user device 110. Herein, the server 120 may retrieve from the database 130 the number of failed authentication attempts associated with the first user device 110.

In step 510, the server 120 may detect or receive network signal strength at which the at least one user device (the user device 110) is attempting to access the network. For example, a distance from a router of the network may be determined to assess the network signal strength. A bad actor may be trying to access the network from that distance, which may be a distance beyond a normal distance from which an authorized user can access the network. For example, a potential network intruder may skim or sniff network signals just outside a room or down the hallway which is enough for accessing the network but at the same time it would not be someone sitting in the room where the network is set up.

In some examples, the network signal strength may be determined based on how fast a ping rate is going to the first user device 110. The network signal strength may also be determined based on the router type of the network. The network signal strength may be grouped as low, medium, and high strength.

In step 515, the server 120 may receive or detect a network connection type of the at least one user device. For example, the first user device 110 may be plugged directly in to a router or to a modem of the network, which may indicate the first user device 110 is at a lower risk.

In step 520, the server 120 may detect or receive a network connection location of the at least one user device in a building. For example, in an office facility with a map and the layout of the physical network setting on which different security levels are assigned to different access points at different locations. The network connection location may be, without limitation, an interior office access port, a conference room access point, a restricted area access point, or an access point in the lobby of the facility.

In step 525, the server 120 may retrieve from the database 130 an authentication history of the at least one user device. If a user had been a good standing member on the network for, for example, two years, the risk score associated with the user may be still low even though the user misspelled all the passwords once on the first attempt. The same MAC address or that same unique identifier for the device used by the user may be stored in the database 130, such that authentication history associated with that device can be tracked and retrieved by the server 120.

In step 530, the server 120 may determine credential/password similarities between the one or more failed authentication attempts. For example, if someone misspelled the password by one character, then that maybe a lower risk event than if someone is just guessing random passwords that are in their iterate. For example, someone may randomly try password123, password345, or passwordABC that looks really suspicious. By performing actual character similarity or password similarity, the risk score associated with the first user device 110 can be determined reflecting the effect of password spelling.

In step 535, the server 120 may employ one or more machine learning algorithms to determine the first risk score. Exemplary machine learning algorithms include, without limitation, gradient boosting machine, logistic regressions, and neural networks. For example, the one or more machine learning algorithms may determine the first risk score by taking as inputs the network signal strength at which the at least one user device is attempting to access the network, the network connection type of the at least one user device, the network connection location of the at least one user device in a building, the authentication history of the at least one user device, and the computed credential similarities. Each of the inputs may be assigned a different weight reflecting how much impact that input can have on the first risk score.

In some examples, the server 120 can utilize information described herein, such as the inputs noted above, and various models can be generated. The server 120 can then apply the generated models to determine the first risk score.

Server 120 can utilize various neural networks, such as convolutional neural networks ("CNNs") or recurrent neural networks ("RNNs"), to generate the models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The one or more machine learning algorithms may be trained using training data. For example, the training data may include previous instances of hackers gaining access, their access attempts and methods, and the activities on the network they conducted. The training data may also include "white hat" data generated by authorized hackers retained by the administrator of the network to test network security. The models described herein may be trained on one or more training datasets, each of which may comprise one or more types of data. In some examples, the training datasets may comprise previously-collected data, such as data collected from previous uses of the same type of systems described herein and data collected from different types of systems. In other examples, the training datasets may comprise continuously-collected data based on the current operation of the instant system and continuously-collected data from the operation of other systems. In some examples, the training dataset may include anticipated data, such as anticipated future workloads (e.g., network monitoring and access attempts), currently scheduled workloads, and planned future workloads, for the instant system and/or other systems. In other examples, the training datasets can include previous predictions for the instant system and other types of system, and may further include results data indicative of the accuracy of the previous predictions. In accordance with these examples, the predictive models described herein may be trained prior to use and the training may continue with updated data sets that reflect additional information.

In step 540, the server 120 may display, present, and/or transmit the first risk score for the at least one user device to the owner or administrator of the network. Specifically, the server 120 may transmit the determined first risk score for the at least one user device to the second user device 140 associated with the owner or administrator of the network.

FIG. 6 illustrates some examples of determined first risk score according to an embodiment. As described above, the second risk score or the post-authentication score may be determined similarly as the first risk score, and may also take various forms as shown herein in FIG. 6.

As shown in FIG. 6, the first risk score may include, but not limited to, these example forms. The first risk score may be on a scale of 1 to 5, with 1 being a lowest risk and 5 being a highest risk, as shown in Example 1 (610). The first risk score may be on a scale of A to E, with A being a lowest risk and E being a highest risk, as shown in Example 2 (620). The first risk score may be on a scale of 20 to 100 having a 20 increase interval, with 20 being a lowest risk and 100 being a highest risk, as shown in Example 3 (630). The first risk score may be a Boolean value with "true" being a risk and "False" being no risk, as shown in Example 4 (640). The first risk score may also be non-numerical values, such as "safe", "slightly safe", "low risk", "medium risk", and "high risk" as shown in Example 5 (650).

In some examples, exemplary procedures in accordance with the present disclosure described herein may be performed by a processing arrangement and/or a computing arrangement (e.g., computer hardware arrangement). Such processing/computing arrangement may be, for example entirely or a part of, or include, but not limited to, a computer/processor that may include, for example one or more microprocessors, and use instructions stored on a computer-accessible medium (e.g., RAM, ROM, hard drive, or other storage device). For example, a computer-accessible medium may be part of the memory of the first user device 110, the server 120, and/or the second user device 140 or other computer hardware arrangement.

In some examples, a computer-accessible medium (e.g., as described herein above, a storage device such as a hard disk, floppy disk, memory stick, CD-ROM, RAM, ROM, etc., or a collection thereof) may be provided (e.g., in communication with the processing arrangement). The computer-accessible medium may contain executable instructions thereon. In addition or alternatively, a storage arrangement may be provided separately from the computer-accessible medium, which may provide the instructions to the processing arrangement so as to configure the processing arrangement to execute certain exemplary procedures, processes, and methods, as described herein above, for example.

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A security system for a network, comprising:
 a processor; and
 a memory storing instructions executable by the processor,
 wherein, upon execution of the instructions by the processor, the processor is configured to:
  detect one or more failed authentication attempts to access the network by at least one user device;
  determine a number of the one or more failed authentication attempts;
  determine a first risk score for the at least one user device based on the number of the one or more failed authentication attempts;
  determine whether the first risk score of the at least one user device is equal to or greater than a first risk score threshold;
  in response to a determination that the first risk score of the at least one user device is equal to or greater than the first risk score threshold, generate a first notification indicating that the at least one user device is attempting to gain unauthorized access onto the network;

transmit the first notification to an administrator of the network;
determine whether the at least one user device is successfully authenticated to access the network after the number of the one or more failed authentication attempts have been detected;
in response to a determination that the at least one user device is successfully authenticated to access the network after the number of the one or more failed authentication attempts have been detected, apply a first set of network activity restrictions to the at least one user device, such that the at least one user device is restricted to access the network under the first set of network activity restrictions;
monitor network activities of the at least one user device when the at least one user device is accessing the network under the first set of network activity restrictions;
determine a second risk score for the at least one user device based on the monitored network activities;
determine whether the second risk score is equal to or greater than a second risk score threshold;
when the second risk score is determined to be equal to or greater than the second risk score threshold, apply a second set of network activity restrictions to the at least one user device, such that the at least one user device is restricted to access the network under the second set of network activity restrictions;
generate a second notification indicating that the at least one user device is performing unusual network activities on the network; and
transmit the second notification to the administrator of the network,
wherein the monitored network activities of the at least one user device include at least one selected from the group of downloading a large amount of data, exporting a large amount of data outside of the network, visiting an unexpected website, and visiting a restricted website.

2. The security system of claim 1, wherein the second set of network activity restrictions includes disconnecting the at least one user device from the network.

3. The security system of claim 1, wherein the network is at least one selected from the group of a wireless network and a wired network.

4. The security system of claim 1, wherein the at least one user device is identified by at least one selected from the group of a MAC address of the at least one user device and an Internet protocol (IP) address of the at least one user device.

5. The security system of claim 1, wherein the first set of network activity restrictions include at least one selected from the group of reducing network connection speed of the at least one user device, restricting Internet protocol (IP) addresses that the at least one user is allowed to ping, and limiting ability of the at least one user device to adjust settings of the network.

6. The security system of claim 1, wherein the first risk score is further determined based on at least one selected from the group of a network signal strength at which the at least one user device is attempting to access the network, a network connection type of the at least one user device, and a network connection location of the at least one user device in a building.

7. The security system of claim 1, wherein the processor is further configured to:

track an authentication history of the at least one user device; and
determine the first risk score based on the authentication history of the at least one user device.

8. The security system of claim 1, wherein the processor is further configured to:
compute credential similarities between the one or more failed authentication attempts; and
determine the first risk score based on the computed credential similarities.

9. The security system of claim 1, wherein the first risk score is determined using a machine learning algorithm.

10. The security system of claim 1, wherein the processor is further configured to:
in response to the determination that the first risk score of the at least one user device is equal to or greater than the first risk score threshold, generate a second notification indicating that the at least one user device is attempting to gain unauthorized access onto the network; and
transmit the second notification to an external party other than the administrator of the network.

11. A method for network security, comprising:
detecting, by a server, one or more failed authentication attempts to access a network by at least one user device;
determining, by the server, a number of the one or more failed authentication attempts;
determining, by the server, a first risk score for the at least one user device based on the number of the one or more failed authentication attempts;
determining, by the server, whether the first risk score of the at least one user device is equal to or greater than a first risk score threshold;
in response to a determination that the first risk score of the at least one user device is equal to or greater than the first risk score threshold, generating, by the server, a first notification indicating that the at least one user device is attempting to gain unauthorized access onto the network;
transmitting, by the server, the first notification to an administrator of the network;
determining, by the server, whether the at least one user device is successfully authenticated to access the network after the number of the one or more failed authentication attempts have been detected;
in response to a determination that the at least one user device is successfully authenticated to access the network after the number of the one or more failed authentication attempts have been detected, applying, by the server, a first set of network activity restrictions to the at least one user device, such that the at least one user device is restricted to access the network under the first set of network activity restrictions;
monitoring, by the server, network activities of the at least one user device when the at least one user device is accessing the network under the first set of network activity restrictions;
determining, by the server, a second risk score for the at least one user device based on the monitored network activities;
determining, by the server, whether the second risk score is equal to or greater than a second risk score threshold;
when the second risk score is determined to be equal to or greater than the second risk score threshold, applying, by the server, a second set of network activity restrictions to the at least one user device, such that the at least one user device is restricted to access the network under the second set of network activity restrictions;

generating, by the server, a second notification indicating that the at least one user device is performing unusual network activities on the network; and transmitting, by the server, the second notification to the administrator of the network, wherein the monitored network activities of the at least one user device include at least one selected from the group of downloading a large amount of data, exporting a large amount of data outside of the network, visiting an unexpected website, and visiting a restricted website.

12. The method of claim 11, further comprising:
determining, by the server, the first risk score based on at least one selected from the group of a network signal strength at which the at least one user device is attempting to access the network, a network connection type of the at least one user device, and a network connection location of the at least one user device in a building.

13. The method of claim 11, further comprising:
in response to the determination that the first risk score of the at least one user device is equal to or greater than the first risk score threshold, generating, by the server, a second notification indicating that the at least one user device is attempting to gain unauthorized access onto the network; and transmitting, by the server, the second notification to an external party other than the administrator of the network.

14. The method of claim 11, wherein the at least one user device is identified by at least one selected from the group of a MAC address of the at least one user device and an Internet protocol (IP) address of the at least one user device.

15. The method of claim 11, further comprising:
tracking, by the server, an authentication history of the at least one user device; and determining, by the server, the first risk score based on the authentication history of the at least one user device.

16. The method of claim 11, further comprising:
computing, by the server, credential similarities between the one or more failed authentication attempts; and determining, by the server, the first risk score based on the computed credential similarities.

17. A non-transitory computer-accessible medium having stored thereon computer-executable instructions for providing network security, wherein, when the instructions being executed by a computer arrangement, the computer arrangement is configured to perform procedures comprising:

detecting one or more failed authentication attempts to access a network by at least one user device;

determining a number of the one or more failed authentication attempts;

determining a first risk score for the at least one user device based on the number of the one or more failed authentication attempts;

determining whether the first risk score of the at least one user device is equal to or greater than a first risk score threshold;

in response to a determination that the first risk score of the at least one user device is equal to or greater than the first risk score threshold, generating a first notification indicating that the at least one user device is attempting to gain unauthorized access onto the network;

transmitting the first notification to an administrator of the network;

determining whether the at least one user device is successfully authenticated to access the network after the number of the one or more failed authentication attempts have been detected;

in response to a determination that the at least one user device is successfully authenticated to access the network after the number of the one or more failed authentication attempts have been detected, applying a first set of network activity restrictions to the at least one user device, such that the at least one user device is restricted to access the network under the first set of network activity restrictions;

monitoring network activities of the at least one user device when the at least one user device is accessing the network under the first set of network activity restrictions;

determining a second risk score for the at least one user device based on the monitored network activities;

determining whether the second risk score is equal to or greater than a second risk score threshold;

when the second risk score is determined to be equal to or greater than the second risk score threshold, applying a second set of network activity restrictions to the at least one user device, such that the at least one user device is restricted to access the network under the second set of network activity restrictions;

generating a second notification indicating that the at least one user device is performing unusual network activities on the network; and transmitting the second notification to the administrator of the network, wherein the monitored network activities of the at least one user device include at least one selected from the group of downloading a large amount of data, exporting a large amount of data outside of the network, visiting an unexpected website, and visiting a restricted website.

18. The non-transitory computer-accessible medium of claim 17, wherein the second set of network activity restrictions includes disconnecting the at least one user device from the network.

19. The non-transitory computer-accessible medium of claim 17, wherein the first set of network activity restrictions include at least one selected from the group of reducing network connection speed of the at least one user device, restricting Internet protocol (IP) addresses that the at least one user is allowed to ping, and limiting ability of the at least one user device to adjust settings of the network.

20. The non-transitory computer-accessible medium of claim 17, wherein the first risk score is further determined based on at least one selected from the group of a network signal strength at which the at least one user device is attempting to access the network, a network connection type of the at least one user device, and a network connection location of the at least one user device in a building.

* * * * *